United States Patent
Staley et al.

(10) Patent No.: US 9,365,116 B2
(45) Date of Patent: Jun. 14, 2016

(54) VEHICLE RECHARGING STATION AND SUPPORT DEVICES

(75) Inventors: Scott M. Staley, Dearborn, MI (US); Milos Milacic, New Boston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 951 days.

(21) Appl. No.: 13/555,211

(22) Filed: Jul. 23, 2012

(65) Prior Publication Data

US 2014/0021915 A1    Jan. 23, 2014

(51) Int. Cl.
| | | |
|---|---|---|
| *H02J 7/00* | (2006.01) | |
| *B60L 1/00* | (2006.01) | |
| *H01R 13/635* | (2006.01) | |
| *B60L 11/18* | (2006.01) | |
| *B60L 15/20* | (2006.01) | |

(52) U.S. Cl.
CPC ............ *B60L 1/003* (2013.01); *B60L 11/1818* (2013.01); *B60L 11/1824* (2013.01); *B60L 11/1877* (2013.01); *B60L 15/20* (2013.01); *H01R 13/635* (2013.01); *H02J 7/00* (2013.01); *H02J 7/0027* (2013.01); *B60L 2230/12* (2013.01); *B60L 2240/423* (2013.01); *B60L 2270/32* (2013.01); *B60L 2270/34* (2013.01)

(58) Field of Classification Search
CPC .............. H01R 13/635; H01R 13/7132; Y10S 439/923
USPC .......... 320/109, 108, 104, 107; 439/923, 131, 439/153, 159, 180, 34, 596; 180/65.21
See application file for complete search history.

(56) References Cited

U.S. PATENT DOCUMENTS

| | | | |
|---|---|---|---|
| 4,587,383 A | | 5/1986 | Stoldt |
| 5,297,664 A | * | 3/1994 | Tseng et al. .................. 194/217 |
| 5,306,999 A | | 4/1994 | Hoffman |
| 5,323,099 A | | 6/1994 | Bruni |
| 5,461,298 A | | 10/1995 | Lara |
| 5,575,675 A | | 11/1996 | Endo |
| 5,645,439 A | * | 7/1997 | Nugent et al. ................ 439/159 |
| 5,674,086 A | | 10/1997 | Hashizawa |
| 5,821,731 A | | 10/1998 | Kuki |
| 5,904,323 A | * | 5/1999 | Jakubowski et al. ....... 244/137.4 |
| 6,216,834 B1 | | 4/2001 | Steinhovden |
| 6,338,450 B1 | | 1/2002 | Schwendinger |
| 6,439,360 B1 | | 8/2002 | Miller |
| 6,614,204 B2 | | 9/2003 | Pellegrino |
| 6,854,757 B2 | | 2/2005 | Rehme |
| 7,044,759 B2 | * | 5/2006 | Hughes ......................... 439/180 |
| 7,563,130 B2 | | 7/2009 | Farrar |
| 7,878,866 B1 | | 2/2011 | Kwasny |
| 7,999,506 B1 | * | 8/2011 | Hollar et al. .................. 320/104 |
| 8,016,607 B2 | | 9/2011 | Brown, II |
| 8,058,841 B2 | | 11/2011 | Chander |
| 2007/0126395 A1 | | 6/2007 | Suchar |
| 2009/0015085 A1 | * | 1/2009 | Nakajima ....................... 310/90 |
| 2010/0320964 A1 | * | 12/2010 | Lathrop et al. ............... 320/109 |
| 2011/0074351 A1 | * | 3/2011 | Bianco et al. ................. 320/109 |
| 2012/0313580 A1 | * | 12/2012 | Charnesky et al. ........... 320/109 |

* cited by examiner

Primary Examiner — Alexis B Boateng
(74) Attorney, Agent, or Firm — Carlson, Gaskey & Olds

(57) ABSTRACT

The present disclosure relates to an electric vehicle, including: a connector configured to receive a charging plug; and an ejection mechanism positioned with respect to the connecter, configured to eject the plug under predetermined conditions.

22 Claims, 8 Drawing Sheets

VEHICLE RECHARGING STATION AND SUPPORT DEVICES

TECHNICAL FIELD

The present disclosure relates to vehicle charging stations and supporting devices.

BACKGROUND

Some modern vehicles are configured to run the vehicle's powertrain off of electrical power. These vehicles have reduced emissions and lower fuel consumption. At least for that reason, hybrid electric and electric vehicles have become increasingly popular. With plug-in hybrid electric vehicles and electric vehicles the driver is required to plug the vehicle in at a charging station. Charging time can vary depending on how much of the battery pack has been depleted during the preceding commute, the rate of charge and installation capacity. Using at-home or at-work vehicle charging stations is a matter of routine for users of plug-in hybrid electric and electric vehicles.

It is desirable to have less time consuming ways to charge the vehicle. For example, when electrical vehicles and plug-in hybrid electrical vehicles are plugged in and a driver starts the car some vehicles are equipped to detect that the plug and connector are still attached and prevent the vehicle from starting up. Still, in these circumstances, a driver has to exit the vehicle, manually unplug the charger, re-enter vehicle and then engage in vehicle start-up.

Also, U.S. Pat. No. 8,058,841 titled "Retractable Overhead Charging Cord Dispenser for Vehicles" teaches a retractable charging cord dispenser with a motorized reel for cord storage. While the teachings of this patent make storage of the cord more efficient, there is a need for smarter actuation of the reel motor as well as control over charger ejection.

It is therefore desirable to have an automated ejection and retraction sequence for the connector, plug and cord used in a vehicle charging station.

SUMMARY

The present disclosure addresses one or more of the above-mentioned issues. Other features and/or advantages will become apparent from the description which follows.

One exemplary embodiment relates to an electric vehicle, having: a connector configured to receive a charging plug; and an ejection mechanism positioned with respect to the connecter, configured to eject the plug under predetermined conditions.

Another exemplary embodiment relates to a plug ejection mechanism for electric vehicles, including: a spring configured to apply a force to a charging plug when inserted in a connector; a release lever configured to selectively retain the spring in a compressed position; and an actuator configured to control the release lever.

Another exemplary embodiment relates to a vehicle charging station, including: a self-retracting reel assembly for a plug and power cord configured to retract the power cord when a predetermined status is perceived.

One advantage of the present disclosure is that it provides teaching a vehicle charging system where a driver does not have to exit the vehicle in order to unplug the charging plug.

The invention will be explained in greater detail below by way of example with reference to the figures, in which the same reference numbers are used in the figures for identical or essentially identical elements. The above features and advantages and other features and advantages of the present invention are readily apparent from the following detailed description of the best modes for carrying out the invention when taken in connection with the accompanying drawings. In the figures:

DETAILED DESCRIPTION

Figure 1:
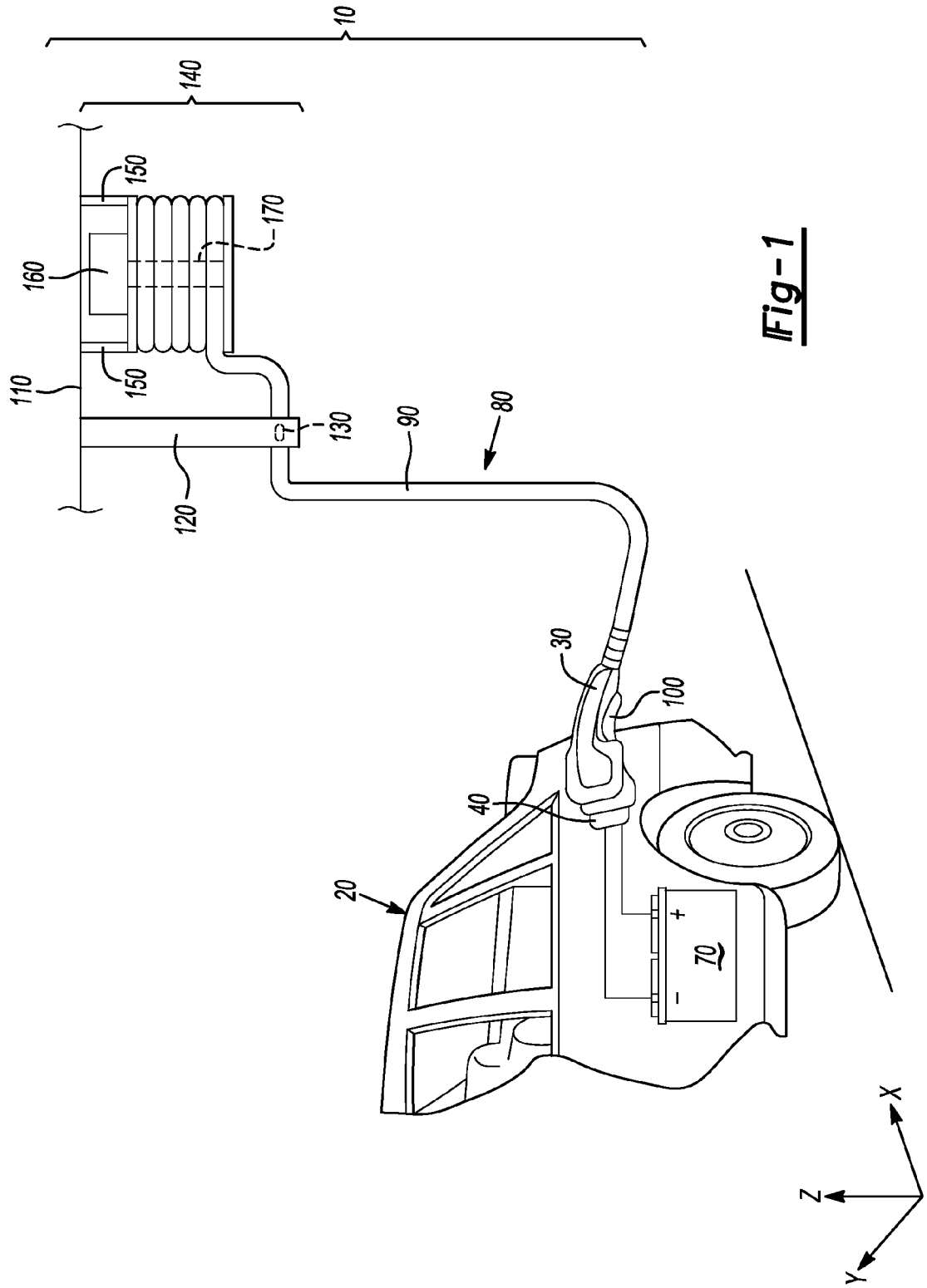
FIG. 1 is a perspective view of an exemplary vehicle charging station connected to a vehicle.

Referring to the drawings, wherein like characters represent examples of the same or corresponding parts throughout the several views, there is shown an electric vehicle with ejection mechanism that will eject or discharge a charging plug from the vehicle's connector under predetermined conditions. A vehicle control unit, e.g., an engine control unit (ECU) or vehicle control module (VCM), is configured to actuate the ejection mechanism. In some embodiments, the ejection mechanism is actuated when the vehicle begins a start-up sequence. In other embodiments, the ejection mechanism is configured to receive an eject command signal from a user interface. The charging plug is thereafter automatically ejected. The teachings herein are applicable to any type of chargeable vehicle including, for example, electric vehicles, fuel cells, or plug-in hybrid-electric vehicles applied on any different type of vehicle platform including, but not limited to, pickup trucks, vans, minivans, sports utility vehicles, sedans, coupes, commercial vehicles and all utility vehicles.

Also discussed hereinbelow is a vehicle charging station that can be used with a chargeable vehicle. The charging station includes a motorized reel assembly for a power cord. The station is configured to automatically retract the power cord when a predetermined status is perceived or detected. In some embodiments, the charging station is configured to retract the power cord when it is detected that the plug is detached from the connector. In other embodiments, the charging station is configured to receive a user command to retract the cord.

Figure 2:
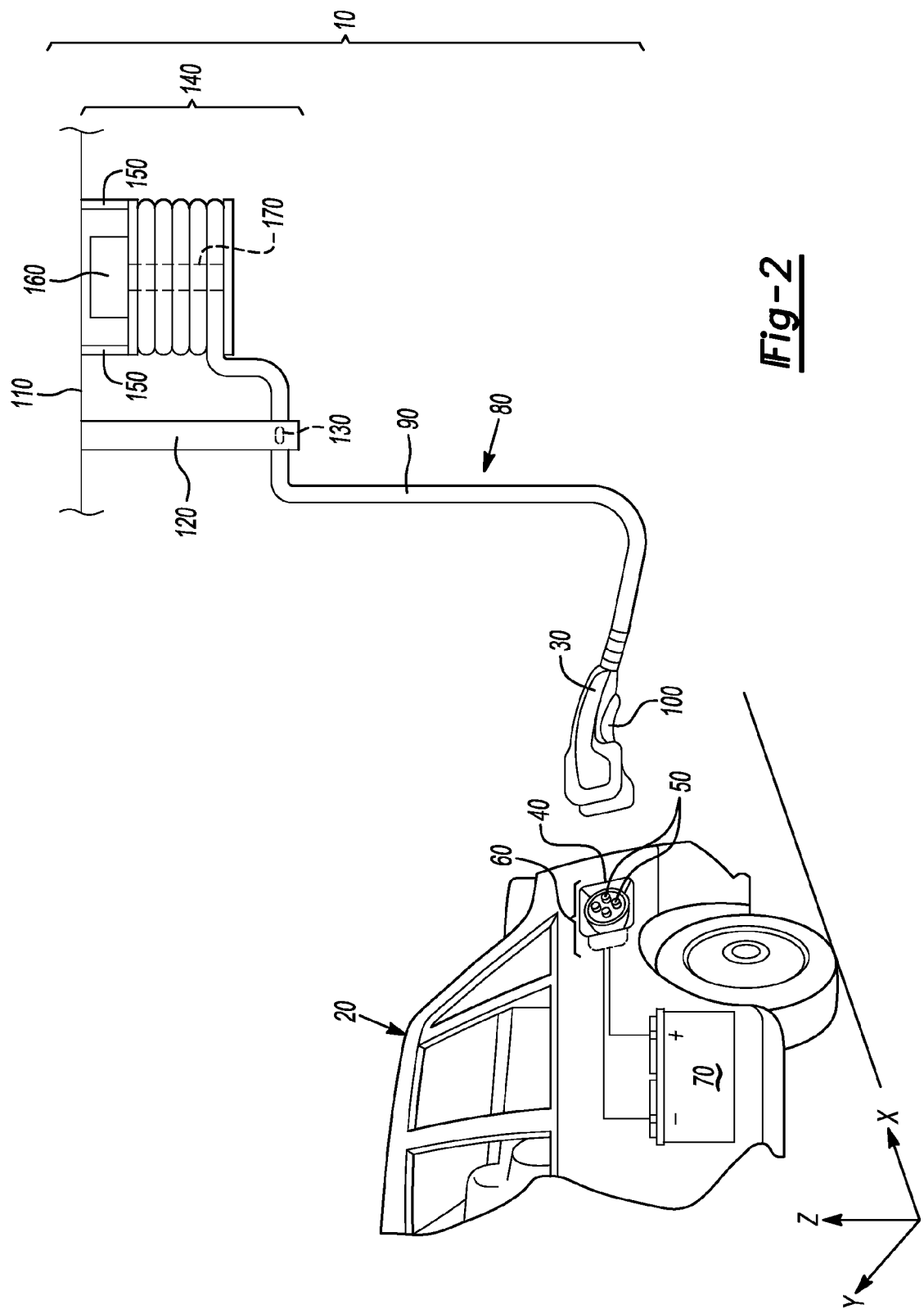
FIG. 2 is a perspective view of the vehicle charging station of FIG. 1 disconnected from the vehicle.

Referring now to FIGS. 1 and 2, there is shown therein an exemplary vehicle charging station 10 with a parked vehicle 20 partially shown in perspective view. In FIG. 2, a plug 30 is detached from a vehicle connector (or receptacle) 40 thus the prongs 50 or receptor of the connector is showing. In FIGS. 1 and 2, the rear section of the vehicle 20 is shown with the charging access point 60 connected to the charging plug 30. The vehicle 20 is an electric vehicle and includes a battery pack 70 illustrated with positive and negative terminals. The distance of the charging access point 60, as shown in FIG. 2, with respect to the power plug assembly 80 is within an assigned range when the vehicle is appropriately parked.

The power plug assembly 80, as shown in FIG. 1, includes the power plug 30 linked to an electrical power source (not shown) through power cord 90. Plug 30 includes a release trigger 100 or handle at the base of the plug housing. Manual attachment and detachment is controlled through the release trigger 100. Cord 90 is included in the charging station 10 and can be tethered to a garage roof 110 or ceiling through arm 120, as shown. In the shown embodiment, arm 120 includes a track 130 or roller bearings to assist in movement of the cord 90 with respect to the arm. Offset from the arm 120 is a reel assembly 140. Reel assembly 140 can be mounted to the ceiling via brackets 150, as shown. In other embodiments, reel assembly is mounted to the wall or floor. A motor 160 is attached to the reel assembly 140. In the illustrated embodiment, motor 160 is configured to turn a center shaft 170 (directly or via gearing, not shown) of the reel clockwise or counterclockwise with respect to the center shaft or vertical axis, Z, for retraction and deployment of the plug, respectively. A control unit (e.g., system controller 920 as discussed with respect to FIG. 11) is included in the reel assembly 140 to control motor rotation or stagnation.

Figure 3:
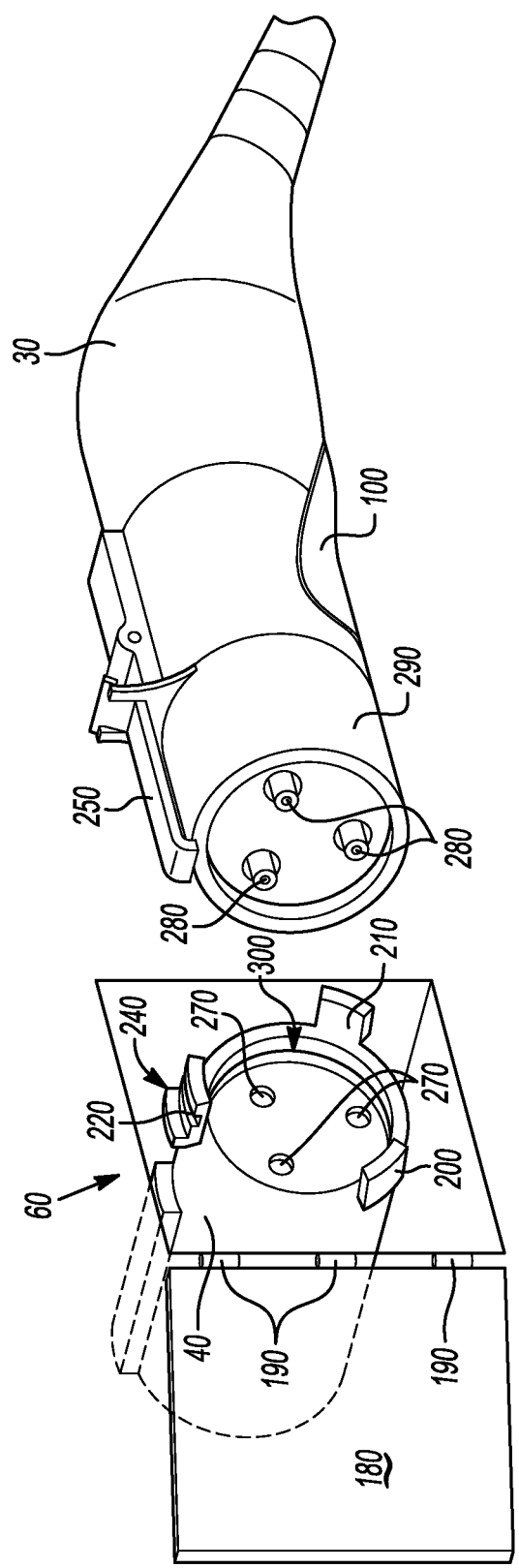
FIG. 3 is perspective view of the connector and plug of FIG. 1.

Referring now to FIG. 3, there is shown therein a perspective view of the vehicle connector 40 and plug 30. The plug 30 is shown detached from the vehicle connector 40. Connector 40 is embedded in the vehicle behind the outer sheet metal. Charging access point 60 includes a door 180 configured to pivot about hinges 190. Connector 40 includes a series of tabs 200, 210, 220 annularly positioned around a circumference of the connector face. In this embodiment tabs are positioned 120 degrees apart. Tab 200 and tab 210 are support tabs configured to vertically reinforce the plug 30 when attached to connector. Tab 220 includes a hook 240 onto which an actuable release lever 250 on the plug 30 can attach. Lever 250 is pivotally mounted to the plug housing and connected to the release trigger 100 through a two-bar linkage (not shown). Mating terminals 270, 280 are included in the connector 40 and plug 30, respectively. A nozzle 290 of plug is configured to fit into a groove 300 in the connector 40.

Figure 4:
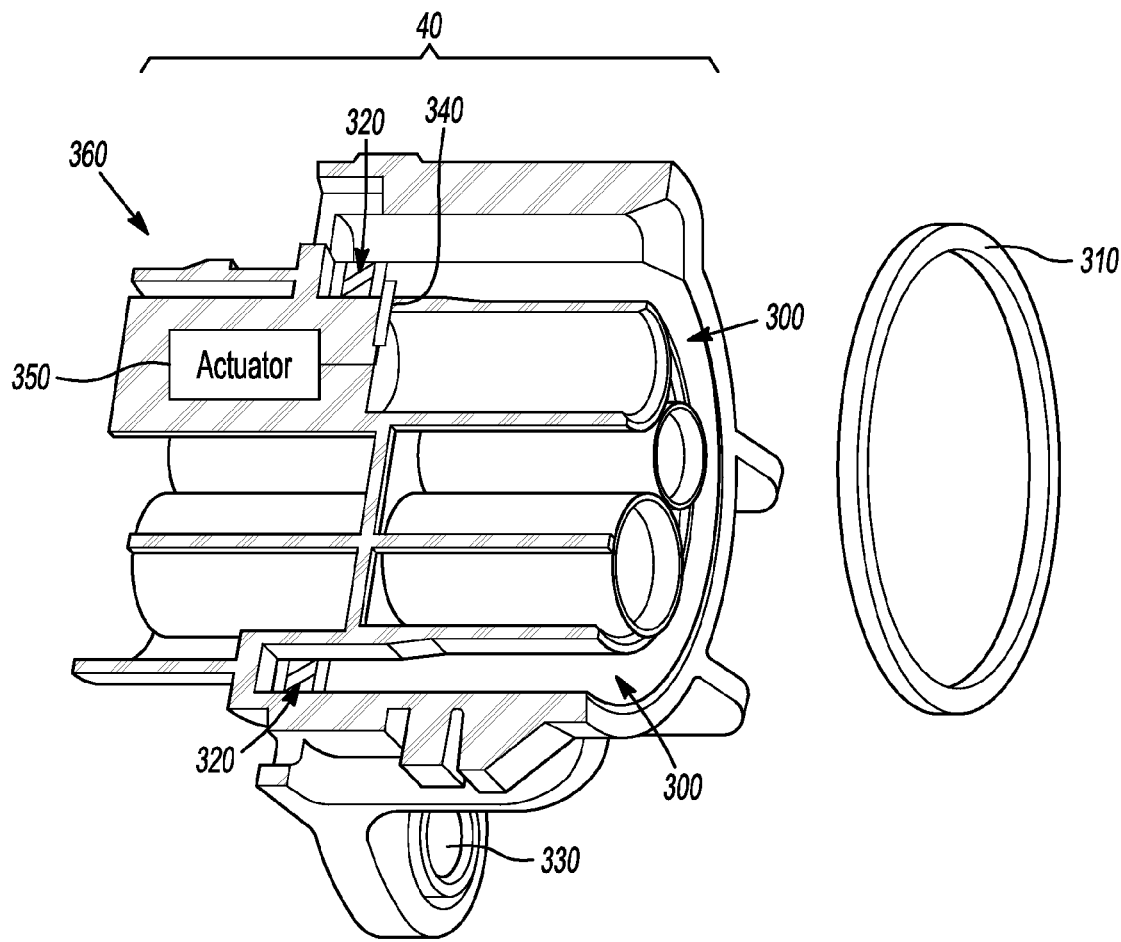
FIG. 4 is an exploded view of the connector assembly of FIG. 3.

Adjacent to the groove 300 in connector 40 is a spring-loaded surface 310, as shown in FIG. 4, configured to apply a normal load to the plug nozzle 290 (of FIG. 3) when a release spring 320 is not compressed. FIG. 4 illustrates an exploded view of the connector 40 of FIG. 3. Connector 40 is attached to a vehicle structure by fastener 330. The spring-loaded surface 310 is embedded in groove 300 as shown. Surface 310 is an annular washer or ring configured to fit in groove 300 of connector. The surface 310 can be composed of any material including polymers or metal. In this embodiment, surface 310 is composed of a non-conductive material, e.g., rubber or plastic. Spring deployment is controlled by a release lever 340. An exemplary release lever 340 is discussed in detail hereinbelow with respect to FIGS. 9 and 10. Release lever 340 is controlled by an actuator 350. Actuator 350 is configured to change the position of the release lever 340 from an attachment position to a release position. In one embodiment, the actuator 350 is a magnetic actuator and the release lever is configured to respond to the magnetic field. In another embodiment, the actuator is a pneumatic actuator.

Figure 5:
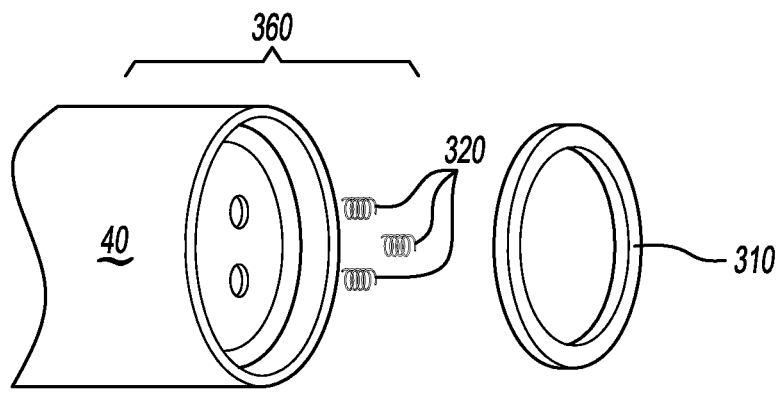
FIG. 5 is another exploded view of the connector assembly of FIG. 4.

FIG. 5 details the ejection mechanism 360 used with the connector of FIG. 4. An exploded view of the ejection mechanism 360 is shown. Behind the surface 310 are a series of coil springs 320 annularly disposed with respect to the connector housing. Springs 320 are compressed axially along the connector housing when the ejection mechanism 360 is inactive. Springs 320 are commonly anchored to the connector housing and surface 310. Fewer or more springs can be incorporated into the ejection mechanism.

Figure 6:
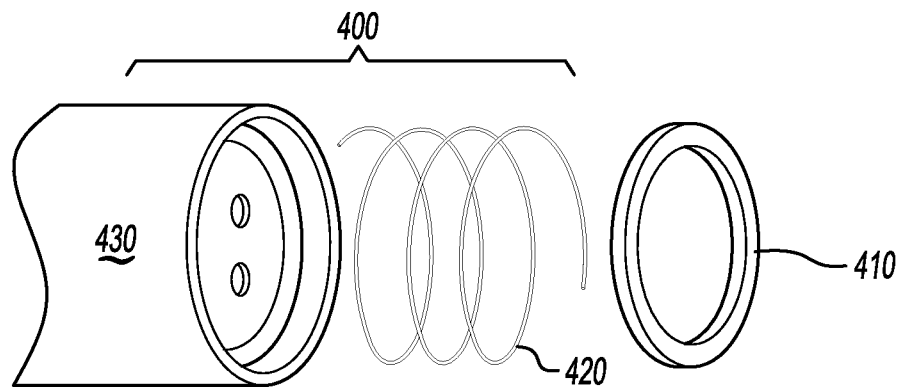
FIG. 6 is an exploded view of another exemplary connector assembly according to the present disclosure.
Figure 7:
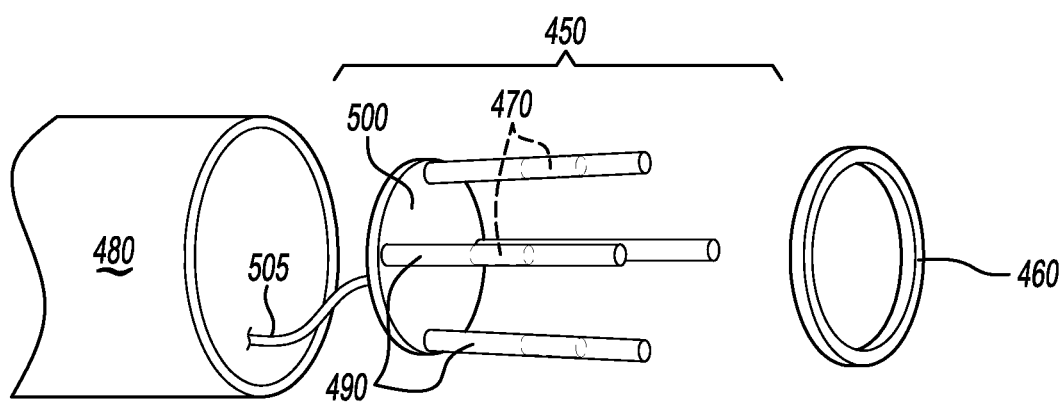
FIG. 7 is an exploded view of another exemplary connector assembly according to the present disclosure.
Figure 8:
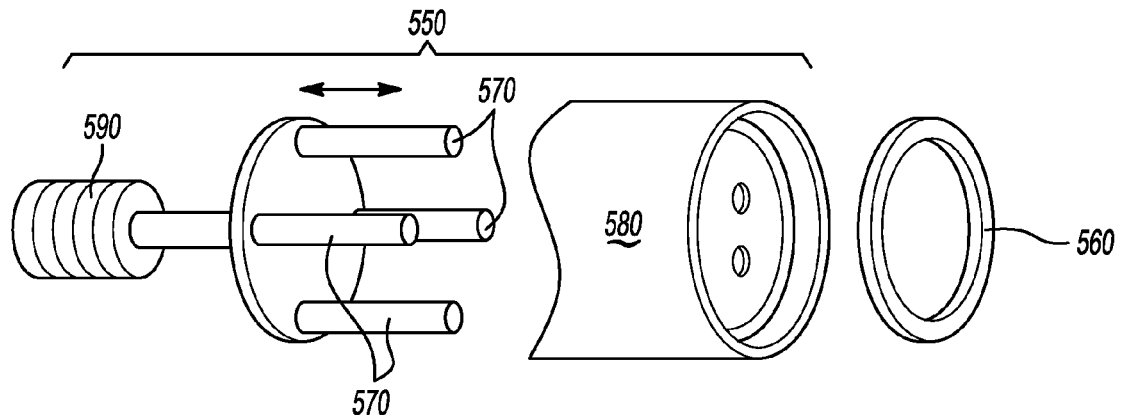
FIG. 8 is an exploded view of another exemplary connector assembly according to the present disclosure.

Now turning to FIGS. 6-8, there are shown therein several other exemplary embodiments of ejection mechanisms for a vehicle connector. In FIG. 6 there is shown, an exploded view of another exemplary ejection mechanism 400. Behind a surface 410 is a single coil spring 420 annularly disposed with respect to the connector housing 430. Spring 420 is compressed axially along the connector housing 430 when the ejection mechanism 400 is inactive. Spring 420 is also commonly anchored to the connector housing 430 and surface 410.

FIG. 7 illustrates another exemplary ejection mechanism 450 for use with a vehicle connector according to the present disclosure. FIG. 7 is an exploded view of the ejection mechanism 450. Behind a surface 460 are a series of pistons 470 annularly disposed with respect to the connector housing 480. Pistons 470 are configured to move axially along the connector housing 480. Each piston 470 is stored in a fluid passage 490. A hydraulic or pneumatic actuator 500 is linked to a hydraulic source through line 505, with pump or compressor connected to the fluid passages 490. Pneumatic actuator 500 can include valves (not shown) between each fluid passage 490 and hydraulic source. Valves can be, for example, electromechanical valves controlled by the ECU. Fewer or more pistons can be incorporated into the connector assembly.

Now turning to FIG. 8, which illustrates another exemplary ejection mechanism 550 for use with a vehicle connector according to the present disclosure. FIG. 8 is an exploded view of the ejection mechanism 550. Behind the surface 560 are a series of prongs 570 annularly disposed with respect to the connector housing 580. Prongs 570 are connected to a solenoid 590. Solenoid 590 is configured to move axially along the connector housing 580. Solenoid 590 can be, for example, controlled by the ECU. In another embodiment, solenoid 590 also triggers release of the handle-mounted release trigger (e.g., 100 as shown in FIG. 3). Fewer or more prongs or solenoids can be incorporated into the connector.

Figure 9:
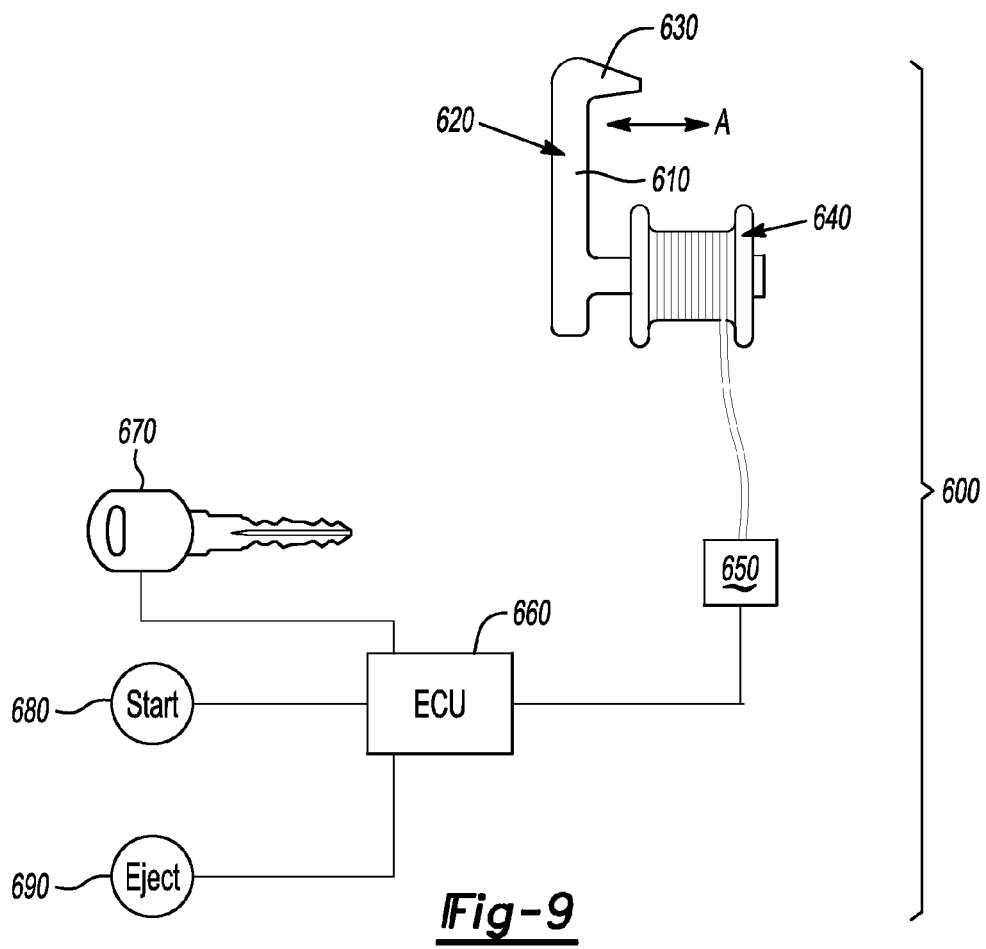
FIG. 9 is a schematic of a release lever compatible with the connector assembly of FIG. 4.

Now turning to FIG. 9, there is shown therein a schematic view of an exemplary release lever assembly 600. The release lever assembly 600 can be used to release the spring-loaded surface (e.g., 310 as shown in FIG. 3) in a connector ejection mechanism. Release lever 610 can also be used to separately or simultaneously release the plug from connector or to replace or assist the handle-mounted release trigger (e.g., 100 as discussed with respect to FIG. 3).

The release lever assembly 600, shown in FIG. 9, includes a release arm 620. Release arm 620 has a hook 630 at one end to refrain or restrict a surface from moving. Release arm 620 is configured to linearly move, along axis A, with respect to the vehicle. In this embodiment, a solenoid assembly 640 is connected to another end of the release lever 610. Solenoid 640 is configured to move from a release position to an attachment position. Assembly includes a controller 650 for the solenoid that is linked to the vehicle ECU 660. In another embodiment, the controller 650 is incorporated into the ECU.

ECU 660, as shown in FIG. 9, is configured to actuate the release lever 610 when any one of three different predetermined conditions is met. First, when a vehicle key 670 is positioned inside of the ignition a signal is sent to the ECU 660. Vehicle key detection can be executed, for example, via a metallic key shaft completing a circuit when fully inserted in the ignition or a switch in the vehicle ignition.

ECU 660, as shown in FIG. 9, is secondly compatible for use with a keyless entry system. In one embodiment, once the wireless authentication device for keyless entry is detected by the VCM, ECU 660 is sent a signal. In response, ECU 660 actuates the release lever 610. In another embodiment, upon depression of the start button 680, the ECU 660 is configured to actuate the release lever 610. In this manner, when the ECU 660 initiates or detects a vehicle start-up ECU actuates release lever 610 thus activating the ejection mechanism.

Thirdly, as shown in FIG. 9, ECU 660 is configured to actuate the release lever 610 upon receipt of user command to eject the plug from a connector. The vehicle includes an eject button 690 that the vehicle driver can press to actuate the release lever 610 and ejection mechanism. The button 690 can be incorporated into a vehicle instrument panel or steering column accessories panel for example. Button 690 is linked to the vehicle auxiliary power source so that regardless of the operating state of the vehicle, user commands for ejection of the plug will be detected and executed. In one embodiment, button 690 is remotely disposed with respect to the vehicle. Button 690 is incorporated into the vehicle key fob. A receiver on vehicle is configured to accept wireless commands from the key fob and send the ECU 660 an eject command. Bluetooth, RF, infrared or other wireless standards can be incorporated in the receiver and key fob transmitter to enable remote ejection mechanism actuation.

Figure 10:
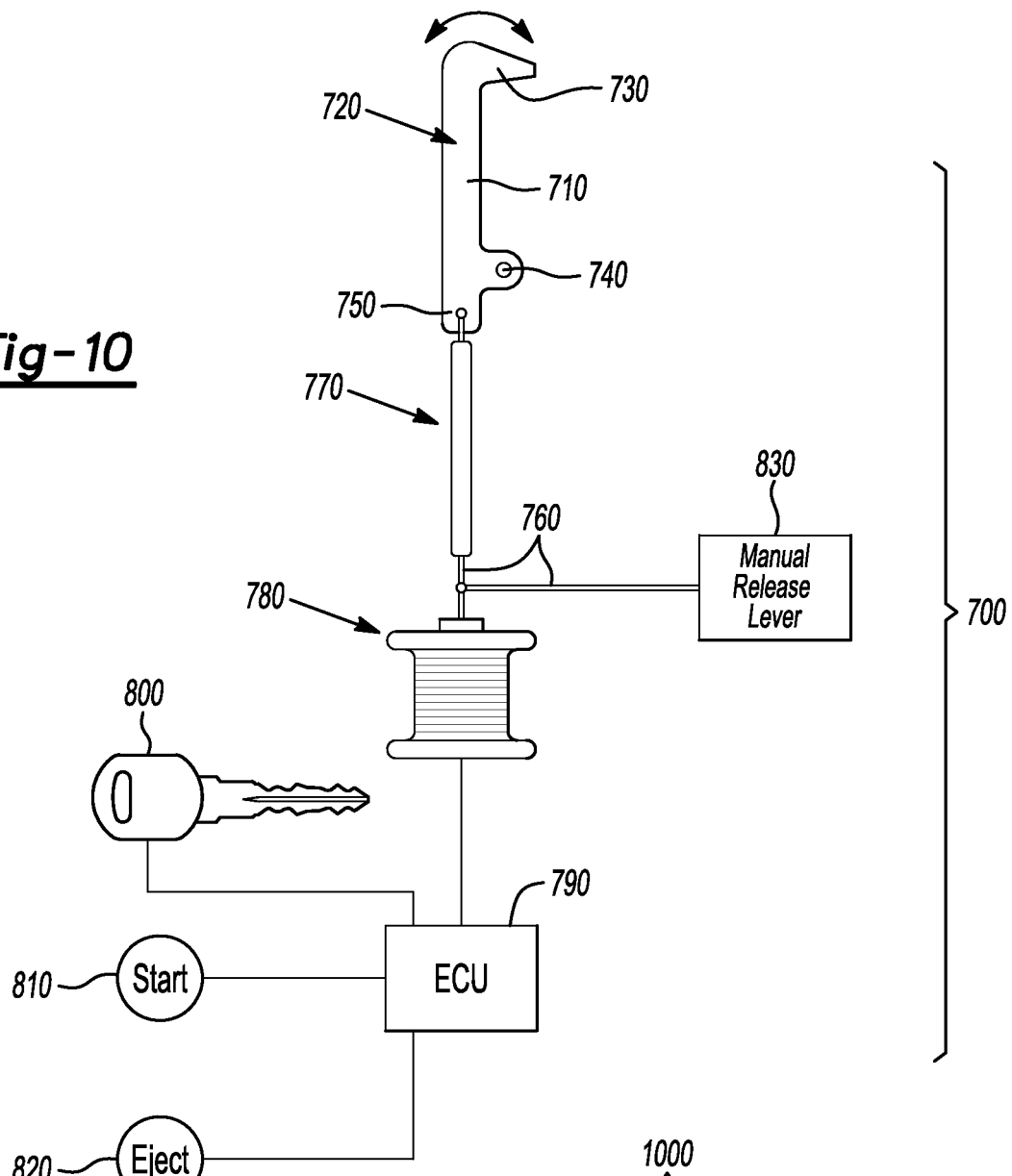
FIG. 10 is a schematic of another exemplary release lever according to the present disclosure.

A different type of release lever assembly 700 is shown in FIG. 10. The release lever assembly 700 is configured for use with the spring-loaded surface (e.g., 310 actuable by release lever 340, as shown in FIG. 3) in a connector ejection mechanism. Release lever 710 can also be used to separately or simultaneously release the plug from connector to replace or assist the handle-mounted release trigger (e.g., 100 as discussed with respect to FIG. 3). Similar to the prior embodiment, the release lever assembly 700 shown in FIG. 10 includes a release arm 720. Release arm 720 has a hook 730 at one end to refrain or restrict a surface from moving. Release arm 720 is pivotally anchored to the vehicle at 740. At end 750 of the arm 720 a mechanical cable 760 is attached. Cable 760 is protected by a sheath 770. Cable 760 extends to a solenoid actuator 780. In this embodiment, actuator 780 is a solenoid. Solenoid actuator 780, as shown in FIG. 10, is configured to move with respect to the vehicle. Assembly includes an ECU 790 configured to control the solenoid actuator 780.

ECU 790, as shown in FIG. 10, is configured to actuate the release lever 710 when any one of different predetermined conditions is met. A first condition is when key 800 is inserted into the ignition as discussed herein above. The second condition is upon actuation of a vehicle keyless start button 810 and the third condition is upon receipt of a signal indicative of a user command to eject the plug via button 820, examples of which are also discussed hereinabove.

As shown in FIG. 10, release lever 710 can also be mechanically actuated. A handle 830 is positioned remote from solenoid actuator 780 and linked to cable 760. Movement of the handle 830 pivots the release lever 710. In another embodiment, handle 830 is positioned in a center console of the vehicle. In another embodiment, handle 830 is placed on the floor proximate the driver seat.

Figure 11:
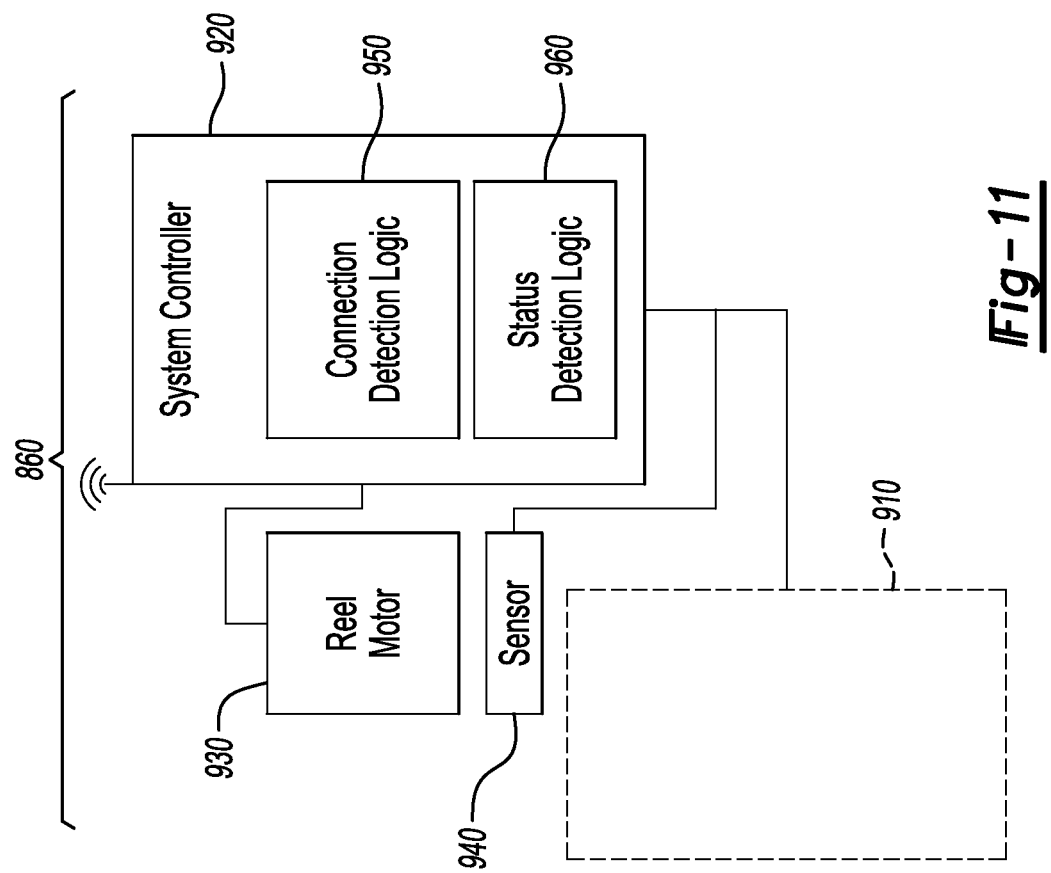
FIG. 11 is a schematic depiction of a vehicle system and charging station according to an exemplary embodiment of the present disclosure.
Figure 11:
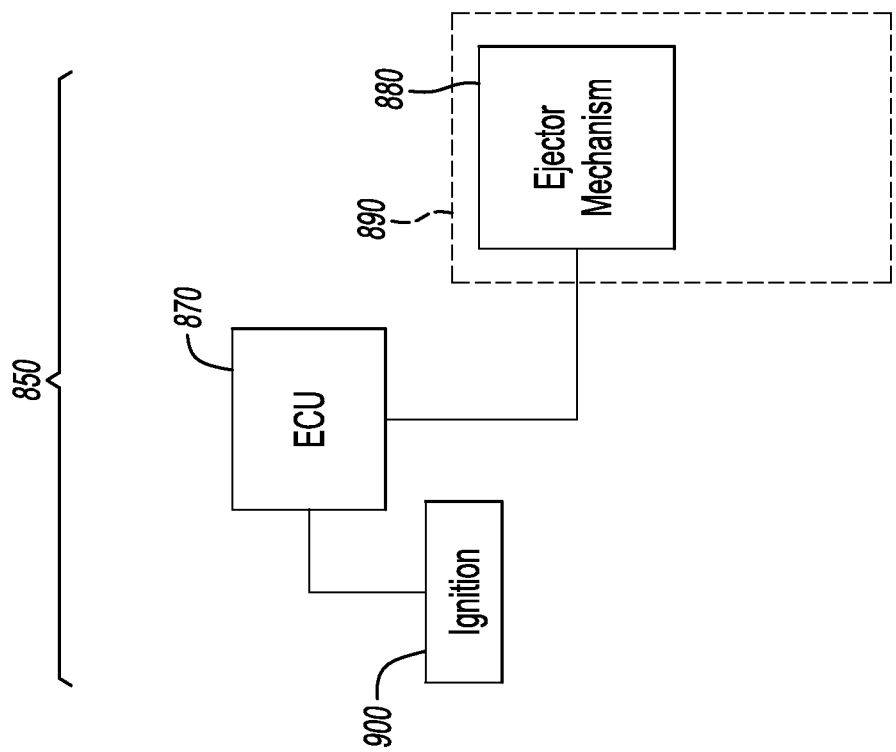

Now with reference to FIG. 11, there is shown therein two exemplary control circuits 850, 860 for a rechargeable vehicle and charging station. A vehicle charging control circuit 850 includes the ECU 870. ECU 870 is configured to actuate an ejection mechanism 880 located in a connector assembly 890. Exemplary ejection mechanisms are discussed with respect to FIGS. 4-8. ECU 870 is linked to a vehicle ignition system 900. Ignition system 900 sends a signal to the ECU 870 when a mechanical key is inserted and/or turned in the ignition. Upon receipt of either signal ECU 870 actuates the ejection mechanism 880.

ECU 870 is also linked to a start button, e.g., 810 as shown in FIG. 10. Start button can be incorporated into the vehicle instrument panel or implemented in a remote start system. Once ECU 870 receives an indication that the start-up command has been sent, ECU actuates ejection mechanism 880. ECU 870 is also linked to a user button for relaying an eject command, e.g., 820 as shown in FIG. 10. If a user presses the eject button a signal is sent to the ECU that subsequently activates the ejection mechanism 880. Though each component is shown linked by wires, wireless communication devices can be incorporated into any of the components to enable wireless links.

A control circuit 860 for a charging station is also schematically shown in FIG. 11. The charging station includes a plug 910 configured to link to the connector 890. Plug 910 is connected to a system controller 920. Controller 920 is configured to control a reel motor 930. Reel motor 930 is configured to turn in a retracting direction and deploying direction with respect to a power cord (e.g., 90 as shown in FIG. 1). As shown in FIG. 11, a sensor 940 (as also discussed hereinbelow) is attached to the motor 930 and configured to read motor torque. System controller 920 includes connection detection logic 950. Connection detection logic 950 is configured to determine a connection status of the plug. In one embodiment, connection detection logic 950 is linked to a receiver in the system controller. Receiver obtains a signal from the vehicle and/or a remote controller related to plug connection status. If the vehicle ECU sends an activation command to the ejection mechanism, the VCM also transmits a signal to the system controller indicative of plug detachment. System controller 920 is configured to actuate the motor 930 and turn a reel shaft (e.g., 170 as shown in FIG. 1) in a retracting direction.

System controller, as shown in FIG. 11, also includes status detection logic 960. Status detection logic 960 is configured to obtain readings from sensors indicative of a connection status for the plug 910. Exemplary sensors can include torque monitors for the motor, current monitors for the motor, tension detection monitors/transducers for the cord, or other sensors. Upon receipt of a signal indicative of plug detachment, system controller is configured to turn the reel shaft in a direction so as to retract the power cord. System controller 920 is also configured to receive a signal indicative of plug deployment being desired or needed. A deployment signal can be sent, for example, by the VCM or a remote controller.

Figure 12:
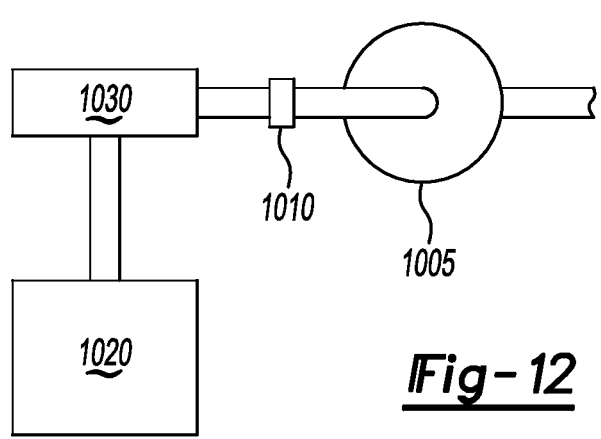
FIG. 12 is a schematic depiction of a cord storage unit according to an exemplary embodiment of the present disclosure.

FIG. 12 schematically partially depicts a vehicle charging station 1000 with an exemplary sensor 1010 used to detect a connection status for the plug 1020. Reel 1005 has a reel shaft motor 1030 that includes sensor 1010 to detect torque load on the motor. When the torque exceeds a predetermined level, system controller is made aware that the plug 1020 is still connected to a vehicle connector or the existence of an obstruction.

While the best modes for carrying out the invention have been described in detail, those familiar with the art to which this invention relates will recognize various alternative designs and embodiments for practicing the invention within the scope of the appended claims.

We claim:

1. An electric vehicle, comprising:
   a connector configured to receive a charging plug;
   an ejection mechanism positioned with respect to the connecter and configured to eject the plug under predetermined conditions; and
   a surface received within a groove of the connector and configured to apply a load to the plug when the ejection mechanism is actuated.

2. The vehicle of claim 1, wherein the ejection mechanism includes:
   a spring configured to apply a force against the plug when inserted in the connector;
   a release lever configured to selectively retain the spring in a compressed position; and
   an actuator configured to control the release lever.

3. The vehicle of claim 2, wherein the release lever is linked to a solenoid.

4. The vehicle of claim 2, wherein the release lever is linked to a manual release lever.

5. The vehicle of claim 1, wherein the ejection mechanism includes:
   a hydraulic piston configured to apply a force against the plug when the predetermined condition is met; and
   an actuator configured to control the hydraulic piston.

6. The vehicle of claim 5, wherein the predetermined condition is a vehicle start-up.

7. The vehicle of claim 1, further comprising:
   a vehicle control module configured to detect when the vehicle is starting;
   wherein the vehicle control module is linked to the ejection mechanism; and
   wherein the predetermined condition is initiation of a vehicle start-up.

8. The vehicle of claim 1, further comprising:
   a user interface; and
   a vehicle control module linked to the user interface;
   wherein the vehicle control module is linked to the ejection mechanism.

9. The vehicle of claim 8, wherein the predetermined condition is an operator signaling an eject command.

10. A plug ejection mechanism for electric vehicles, comprising:
    an annular surface;
    a spring configured to apply a force to a charging plug when inserted in a connector;
    a release lever configured to selectively retain the spring in a compressed position; and
    an actuator configured to control the release lever to move the annular surface to apply the force to the plug.

11. The mechanism of claim 10, wherein the actuator is a solenoid.

12. The mechanism of claim 10, wherein the actuator is a pneumatic actuator.

13. A vehicle charging station, comprising:
    a self-retracting reel assembly for a plug and power cord configured to retract the power cord when a predetermined status is perceived;
    wherein the reel assembly includes:
       a motor configured to turn the reel;
       a controller configured to control the motor; and
       a connection-detection sensor configured to detect whether the plug is connected to a connector based on a torque load on the motor.

14. The station of claim 13, wherein the controller includes connection detection logic.

15. The station of claim 14, wherein the connection detection logic is configured to receive a signal related to a connection status of the plug and turn the motor in a retraction direction when a disconnect status is detected.

16. The station of claim 14, wherein the connection detection logic is configured to receive a signal related to an ejection command and turn the motor in a retraction direction when an ejection command is sent.

17. The station of claim 14, further comprising:
    wherein the connection detection logic is configured to monitor a signal from the connection-detection sensor and turn the motor in a retraction direction when a disconnect status is detected.

18. The station of claim 13, wherein the connection-detection sensor is a torque sensor.

19. The station of claim 13, wherein the controller includes status detection logic.

20. The electric vehicle of claim 1, wherein said surface is an annular washer or an annular ring.

21. The electric vehicle of claim 1, wherein the predetermined condition is an operator signaling an eject command by pressing an eject button.

22. The mechanism of claim 10, wherein said annular surface is a washer or a ring received within a groove of said connector.

* * * * *